3,088,944
PYRAZOLE DERIVATIVES IN THE PREGNANE SERIES

Katsura Morita, Ikeda, Japan, assignor to Takeda Chemical Industries, Ltd., Higashiku, Osaka, Japan
No Drawing. Filed Nov. 24, 1961, Ser. No. 154,853
Claims priority, application Japan Nov. 30, 1960
3 Claims. (Cl. 260—239.5)

The present invention relates to new pyrazole derivatives in the pregnane series and to the method for the preparation of same. Heretofore, the art has endeavoured to synthesize a variety of steroid compounds.

The present inventor has also studied and searched new steroid compounds which may be useful for therapeutic purposes, and succeeded in synthesizing a novel type of steroid compounds. The compound has a pyrazole structure condensed at the 16-, 17- and 20-positions, of a pregnane steroid. Thus the new series of compounds may be any of those represented by the following partial structures I and II,

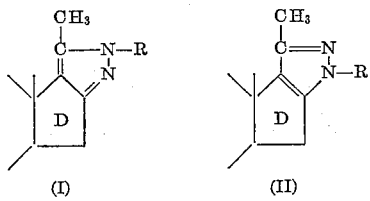

wherein D represents D-ring of a cyclopentano-polyhydrophenanthrene skeleton (steroid skeleton), R stands for hydrogen or a lower alkyl group. The lower alkyl group represented by R may, for example, be methyl, ethyl or propyl group. In case of R being hydrogen in the above-mentioned formulas, the hydrogen may be substituted for by an acyl or an alkyl group.

As an acyl group to be substituted for, there may be counted acetyl, propionyl, benzoyl groups, and among the alkyl group, methyl, ethyl and propyl groups.

These novel compounds may, for example, be synthesized through such a path that 16,20-diketosteroids or their enol type derivatives are allowed to react with hydrazine or its derivatives such as hydrazine hydrate, hydrazine salt, methyl hydrazine, ethyl hydrazine and propyl hydrazine. The product thus obtained may, if desired, be followed by its acylation or alkylation.

It is an object of the present invention to provide new pyrazole derivatives of steroids of pregnane series and another object is to provide the method for their preparation.

In carrying the invention into practice, a little modification of the structure of the steroid skeleton and of side chains may also be employed in the starting material, so long as two ketone groups are present in the 16- and 20-positions simultaneously. For example, the modifications may be 19- or 18-nor derivative, and/or A-, B-, C- or D-ring nor or homo derivatives.

Or, the derivatives may contain one or more substituents or double bonds at a suitable position or suitable positions in steroid skeleton and/or side chains thereof.

Among the substituents, there may be, for instance, methyl group, halogen, oxo, hydroxyl, nitro, acyloxyl, alkoxyl, mercapto, acylmercapto and thioacetyl groups. Even if such 16,20-diketo-derivatives may be those of, for example, enol type ester, ethers, amides, substituted amides or halides, the reaction of the present invention may be carried out without any hindrance.

For the purpose of giving those skilled in the art a better understanding of the invention, the following illustrative typical starting materials to be employed in this invention are given:

3β(or α)-hydroxy-5α(or β)-pregnane-16,20-dione
3β(α)-hydroxypregn-5-ene-16,20-dione
Pregn-4-ene-3,16,20-trione
Pregna-1,4-diene-3,16,20-trione
3β(α)-hydroxy-6-methylpregn-15-ene-16,20-dione
9α-fluoro-11β-hydroxypregna-1,4-diene-3,16,20-trione
3β(α),5α,6β(α)-trihydroxy-5α-pregnane-16,20-dione and the esters, ethers, halides, amides, substituted amides, etc., which contain enol type of the above mentioned compounds.

As the hydrazine derivatives, straight lower alkylhydrazines such as methylhydrazine, ethylhydrazine, propylhydrazine, or their acid salts or hydrazine hydrate may be employed.

The compounds of this invention may be synthesized by allowing two kinds of starting materials to react with each other. Generally the reaction may conveniently be carried out in a solvent at an adequate temperature.

As the solvent, alcohol, ethyl acetate, chloroform, benzene, ethylene chloride, carbon tetrachloride, pyridine, dimethylformamide, dioxane, tetrahydrofuran etc. or their mixture may be preferred, but, as occasion calls, hydrazine or hydrazine derivatives may be employed in place of the solvent. The reaction temperature is generally that on a water bath or below.

In the course of the reaction, the substituent or substituents of the steroid skeleton of the starting material are sometimes transformed through hydrolysis or the like, e.g. acyloxy group into hydroxyl group. But, such a transformation does not hinder the formation of the desired pyrazole ring.

Pyrazole derivatives of pregnane series steroids prepared by such a method as above can further be modified at their functional substituent or functional substituents.

For example, they can be esterified or etherified at their —COOH group or —OH group, or can be converted into their acid salt at their amine or amide group or groups with organic acid or inorganic acid, e.g. hydrochloric acid, sulfuric acid, formic acid, succinic acid and an organic sulfonic acid.

These modifications may be effected by respectively convention methods in steroid chemistry.

These pyrazole derivatives of pregnane series steroid are not only new compounds but also very interesting compounds in pharmacological views.

It has so far been known that 17β-hydroxyl-17α-methyl-andros-4-eno[3,2-c]pyrazole [R. O. Klinton et al.: Journal of the Chemical Society 81, 1513 (1959)], which is a pyrazole-condensed derivative at 3,2-positions of androstane series steroid, has excellent protein anabolism action, and other compounds of this series also have the action of lowering blood pressure [F. M. Sturvant: Proc. Soc. Exper. Biol. and Med. 97, 619 (1958)]. The products of the present invention may be used for similar purposes as in the afore-mentioned known pyrazole-condensed derivatives at the 3,2-positions of androstane compounds.

For the purpose of giving those skilled in the art a better understanding of the present invention, the following illustrative example is given:

Example

To a solution of 1 gram of 3β-acetoxypregn-5-ene-16,20-dione (melting point 160–162° C.) in 50 cubic centimeters of 99% ethanol is added 5 cubic centimeters of 90% hydrazine hydrate.

After being heated for 5 hours on a water-bath, the mixture is left standing overnight at room temperature. The solvent is removed under reduced pressure to separate scale-shaped crystals. With the addition of water, the crystals are collected by filtration and are recrystallized from methanol to obtain 400 milligrams of 3β-hydroxypregn-5-eno[16,17-c]pyrazole. The product has the following properties:

Melting point: >290° C.
Ultraviolet absorption spectrum:

$$\lambda_{max.}^{EtOH}\ 225\ m\mu\ (\epsilon:\ 6200)$$

*Analysis.*—Calcd. for $C_{21}H_{30}ON_2$: C, 77.25; H, 9.26; N, 8.58. Found: C, 76.71; H, 9.39; N, 8.78.

Although the present invention has been described in conjunction with preferred embodiments, it is to be understood that modifications and variations may be resorted to without departing from the spirit and scope of the invention, as those skilled in the art will readily understand.

Such modifications and variations are considered to be within the purview and scope of the invention and appended claims.

Having thus disclosed the invention, what is claimed is:

1. A method for preparing pyrazole derivatives of pregnane series steroids, which comprises allowing a member selected from the group consisting of 16,20-diketosteroids, the nucleus of which contains 21 carbon atoms, and their enol type derivatives, to react with a member selected from the group consisting of hydrazine, hydrazine hydrate, lower alkyl hydrazine, lower alkanoyl hydrazine and benzoyl hydrazine.

2. A method for preparing pyrazole derivatives of pregnane series steroids, which comprises allowing 16,20-diketosteroid, the nucleus of which contains 21 carbon atoms, to react with hydrazine hydrate.

3. A method for preparing 3β-hydroxypregn-5-eno-[16,17-c]pyrazole, which comprises reacting 3β-acetoxypregn-5-eno-16,20-dione with hydrazine hydrate.

References Cited in the file of this patent
UNITED STATES PATENTS 2,937,168  Dodson _____ May 17, 1960